(12) United States Patent
Kobayashi

(10) Patent No.: US 7,154,652 B2
(45) Date of Patent: Dec. 26, 2006

(54) LIGHT SCANNING OPTICAL SYSTEM, IMAGE PROJECTION APPARATUS, AND IMAGE DISPLAY SYSTEM

(75) Inventor: Shuichi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/737,151

(22) Filed: Dec. 15, 2003

(65) Prior Publication Data

US 2004/0125428 A1 Jul. 1, 2004

(30) Foreign Application Priority Data

Dec. 16, 2002 (JP) ............... 2002-363915

(51) Int. Cl.
*G02B 26/08* (2006.01)
(52) U.S. Cl. ...................... 359/216; 359/206
(58) Field of Classification Search ................ 359/205, 359/206, 209, 212, 213, 214, 215, 216, 217, 359/218
See application file for complete search history.

(56) References Cited

U.S. PATENT DOCUMENTS

| | | | |
|---|---|---|---|
| 3,801,180 A | 4/1974 | MaGuire et al. | |
| 4,433,894 A * | 2/1984 | Hanson et al. | ............... 359/218 |
| 4,537,465 A | 8/1985 | Sherman et al. | |
| 5,606,447 A | 2/1997 | Asada et al. | |
| 5,694,180 A | 12/1997 | Deter et al. | |
| 6,654,151 B1 * | 11/2003 | Yamaguchi | ................. 359/196 |
| 2002/0030674 A1 | 3/2002 | Shigeta | |

FOREIGN PATENT DOCUMENTS

| | | |
|---|---|---|
| DE | 4324849 A1 | 2/1995 |
| GB | 2053505 A | 2/1981 |
| JP | 6-3616 | 1/1994 |
| JP | 7-168123 | 7/1995 |
| JP | 7-175005 | 7/1995 |
| JP | 11-259888 | 9/1999 |

* cited by examiner

*Primary Examiner*—Euncha P. Cherry
(74) *Attorney, Agent, or Firm*—Morgan & Finnegan, LLP

(57) ABSTRACT

A light scanning optical system that is capable of increasing a deflection angle without causing optical performance degradation includes a reflection surface for reflecting incident light, a unit for rotating the reflection surface about a swing axis existing in substantially the same plane as the reflection surface, and an optical system that guides light deflected at a first deflection point on the reflection surface to a second deflection point on the reflection surface. The optical system is constructed such that the first deflection point and the second deflection point are in an approximately conjugate relationship.

39 Claims, 9 Drawing Sheets

LIGHT SCANNING OPTICAL SYSTEM, IMAGE PROJECTION APPARATUS, AND IMAGE DISPLAY SYSTEM

BACKGROUND OF THE INVENTION

1. Field of the Invention

The present invention relates to a light scanning optical system, such as a laser printer or a laser display, which displays an image by scanning light, and to an image forming apparatus that uses the scanning optical system. In particular, the present invention relates to a scanning optical system that optically increases a light scanning angle using a micro electro mechanical system (hereinafter referred to as the "MEMS") produced through a semiconductor process.

2. Related Background Art

Heretofore, in an image forming apparatus of a light scanning type such as a laser printer or a laser display, in order to meet demand for a large deflection angle and high-speed scanning, a so-called polygon mirror has been used which is a mirror that is capable of rotating a rotation body having multiple reflection surfaces at high speed. Also, a distance to a scan target point can be reduced by increasing a beam deflection angle, so that various methods for optically increasing the light deflection angle have been proposed.

As an example of the methods, Japanese Patent Application Laid-Open No. H06-003616 discloses a polygon scanner in which an optical system is added to a polygon mirror, thereby increasing the deflection angle. FIGS. 1 and 2 each show a construction of the conventional polygon scanner. With this construction, a light beam entering the polygon mirror is first brought to pass through an optical system and then is caused to enter a reflection surface of the same polygon mirror again, thereby making it possible to increase the deflection angle as compared with a case where deflection is performed only once.

By the way, in recent years, a technique called a micro electro mechanical system (MEMS) produced with a semiconductor process technique has received attention. In particular, a light scanner that uses a light scanning means based on the MEMS technique has received special attention. As an example of the light scanner, U.S. Pat. No. 5,606,447 discloses a light scanning device having a construction shown in FIG. 3. In this drawing, a planar movable plate and a torsion bar axially supporting the movable plate in a rockable manner are formed integrally with a silicon substrate. Also, a planar coil that generates a magnetic field through energization is provided in an upper surface edge portion of the movable plate, a total reflecting mirror is provided in an upper surface center portion surrounded by the planar coil, and permanent magnets that exert magnetic fields on the planar coil are arranged. With this construction, when current is applied to the coil, a Lorentz force is generated and the mirror is driven. By driving the mirror in the vicinity of a mechanical resonance frequency, a large deflection angle is obtained. Such a resonance-type light scanning means is small in size and is light in weight, so that various features are attained such as high-speed driving and small driving energy. However, the magnitude of the deflection angle depends on the torsion angle of the torsion bar, so that in order to obtain a large deflection angle, the torsion bar portion needs to be increased in length, which leads to an increase in device size. Also, when a beam deflection surface is increased in size, it becomes difficult to maintain a high resonance frequency, which means that it is generally difficult to increase the size of the reflection surface as well as the deflection angle.

Methods for increasing the deflection angle of such an MEMS device are also proposed. As an example of the methods, Japanese Patent Application Laid-Open No. H11-259888 discloses a deflection apparatus and an optical information recording and reproducing head having a construction shown in FIG. 4. Generally, as shown in FIG. 5, if a mechanical deflection angle is referred to as "θ", a light deflection angle becomes 2θ. In the deflection apparatus having the construction shown in FIG. 4, however, a galvano-mirror, whose reflection surface is constructed so as to be rotatable in a predetermined direction, is provided and a fixed mirror is arranged so as to oppose the reflection surface of the galvano-mirror. With this construction, a light flux entering the galvano-mirror is caused to enter the fixed mirror at least once and a light flux reflected by the fixed mirror is reflected by the galvano-mirror again, thereby widening the deflection angle. As a result, as shown in FIG. 4, a deflection angle of 4θ is obtained.

In Japanese Patent Application Laid-Open No. H06-003616, however, the polygon mirror is used as a light deflector, and the rotation center of the polygon mirror and a light deflection point (reflection point) do not coincide with each other. Consequently, the light deflection point is displaced in accordance with rotation of the polygon mirror, which causes lowering of optical performance. For instance, points that should be in a mutually conjugate relationship become non-conjugate. Also, optical path interference occurs between incident light and deflected light.

Also, with the construction disclosed in Japanese Patent Application Laid-Open No. H11-259888, although a deflection angle that is four times as large as the mechanical deflection angle θ is obtained indeed, a first deflection point and a second deflection point are spaced apart from each other in an in-plane direction that is perpendicular to a rotation axis, so that the size of the reflection surface is unavoidably increased in a direction that is perpendicular to the torsion bar (in the in-plane direction of the paper plane). Also, when the distance between the fixed mirror and the movable mirror is reduced, optical path interference occurs, so that it becomes impossible to substantially increase an angle of deflection.

SUMMARY OF THE INVENTION

In view of the problems described above, the present invention provides a scanning optical system, which is capable of widening a deflection angle without causing optical path interference and the like, and an image display apparatus that uses the scanning optical system.

In order to solve the above-mentioned problems, according to one aspect of the present invention, a light scanning optical system includes:

a reflection surface that reflects incident light;

means for swinging (rotating) the reflection surface about a swing axis that exists in substantially the same plane as the reflection surface; and an optical system that guides light deflected at a first deflection point on the reflection surface to a second deflection point on the reflection surface, the optical system being constructed such that the first deflection point and the second deflection point are in an approximately conjugate relationship.

In the light scanning optical system as described above, it is preferable that the first deflection point and the second deflection point are points that are different from each other.

Further, in the light scanning optical system as described above, it is preferable that the first deflection point exists at a position substantially displaced from the second deflection point in a direction of the swing axis.

Further, in the light scanning optical system as described above, it is preferable that both of the first deflection point and the second deflection point exist substantially on the swing axis.

Further, in the light scanning optical system as described above, it is preferable that the first deflection point and the second deflection point exist at substantially the same position with respect to a direction that is perpendicular to the swing axis.

Further, in the light scanning optical system as described above, it is preferable that a point that is substantially conjugate with both of the first deflection point and the second deflection point exists on an optical path of light emitted from the first deflection point to enter the second deflection point.

Further, in the light scanning optical system as described above, it is preferable that the optical system includes:

a first optical system that forms a conjugate point that is substantially conjugate with the first deflection point; and a second optical system that sets the conjugate point and the second deflection point in a substantially conjugate relationship.

Further, it is preferable that the light scanning optical system as described above further includes a reflection optical system that guides light emitted from the first optical system to the second optical system.

In the light scanning optical system, it is more preferable that the reflection optical system includes at least one reflection surface, and it is further preferable that the at least one reflection surface is substantially perpendicular to at least one of an optical axis of the first optical system and an optical axis of the second optical system.

Alternatively, it is preferable that the at least one reflection surface is substantially parallel to the swing axis.

Further, in the light scanning optical system as described above, it is preferable that the reflection optical system includes at least two or more reflection surfaces.

Alternatively, it is preferable that at least one of the first optical system and the second optical system has a refractive power only in a direction that is perpendicular to the swing axis.

Further, in the light scanning optical system as described above, it is preferable that the optical system has a refractive power in a direction that is perpendicular to the swing axis.

Alternatively, it is preferable that the optical system has a refractive power only in a direction that is perpendicular to the swing axis.

Further, in the light scanning optical system as described above, it is preferable that the reflection surface makes a rotationally reciprocating motion about the swing axis in a swing direction.

Further, in the light scanning optical system as described above, it is preferable that a center point of a light flux at the first deflection point and a center point of a light flux at the second deflection point are spaced apart from each other on the reflection surface by a limited distance.

Further, in the light scanning optical system as described above, it is preferable that the reflection surface and the swing axis are formed integrally with each other.

Further, in the light scanning optical system as described above, it is preferable that the reflection optical system includes:

a first planar reflection surface that reflects light emitted from the first optical system in a direction that is substantially parallel to the swing axis; and a second planar reflection surface that causes emission light from the first reflection surface to enter the second optical system, and in the light scanning optical system, the first deflection point and the second deflection point are displaced in the direction that is substantially parallel to the swing axis.

Further, in order to solve the above-mentioned problems, according to a further aspect of the present invention, an image projection apparatus includes:

the light scanning optical system as described above;

a light guiding optical system that guides light from a light source to the light scanning optical system; and a projection optical system that projects light from the light scanning optical system onto a projection target surface.

Further, it is preferable that the image projection apparatus as described above further includes a color synthesis optical system that synthesizes light in a plurality of colors emitted from a light source.

Further, in the image projection apparatus as described above, it is preferable that the light in the plurality of colors is light in three colors, red, green, and blue.

Further, in the image projection apparatus as described above, it is preferable that the color synthesis optical system includes one of a cross dichroic prism and a color synthesis prism whose color synthesis surfaces do not intersect each other.

Further, in the image projection apparatus as described above, it is preferable that the color synthesis prism includes a plurality of prisms whose number is one of three and four.

Further, in order to solve the above-mentioned problems, according to a still further aspect of the present invention, an image display system includes:

the image projection apparatus as described above; and an image supply means for supplying image information to the image projection apparatus.

Further, in order to solve the above-mentioned problems, according to a still further aspect of the present invention, a light scanning optical system includes:

a reflection surface that reflects incident light;

means for rotating the reflection surface about a swing axis that exists in substantially the same plane as the reflection surface; and an optical system that guides light deflected at a first deflection point on the reflection surface to a second deflection point that is different from the first deflection point on the reflection surface, and in the light scanning optical system, the first deflection point and the second deflection point are shifted (displaced) in a direction of the swing axis.

Further, according to a still further aspect of the present invention, an image projection apparatus includes:

the light scanning optical system as described above;

a light guiding optical system that guides light from a light source to the light scanning optical system; and a projection optical system that projects light from the light scanning optical system onto a projection target surface.

Further, according to a still further aspect of the present invention, an image display system includes:

the image projection apparatus as described above; and image supply means for supplying image information to the image projection apparatus.

DESCRIPTION OF THE PREFERRED EMBODIMENTS

<First Embodiment>

A first embodiment of the present invention will be described with reference to FIG. 6.

Figure 1:
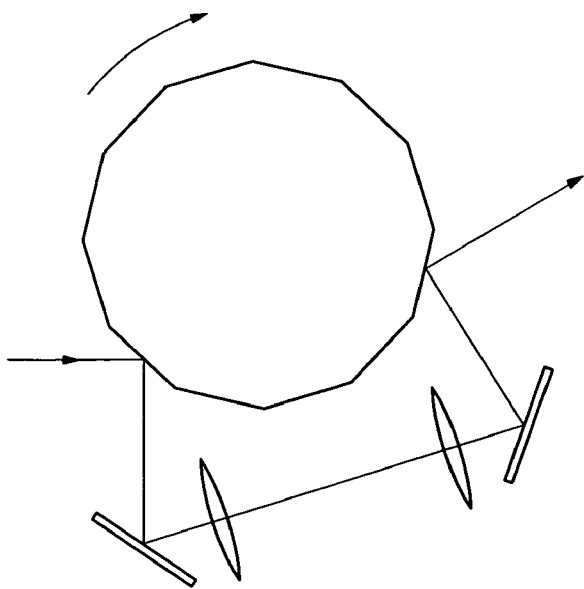
FIG. 1 shows a construction of a conventional deflection angle widening system that uses a polygon mirror.
Figure 2:
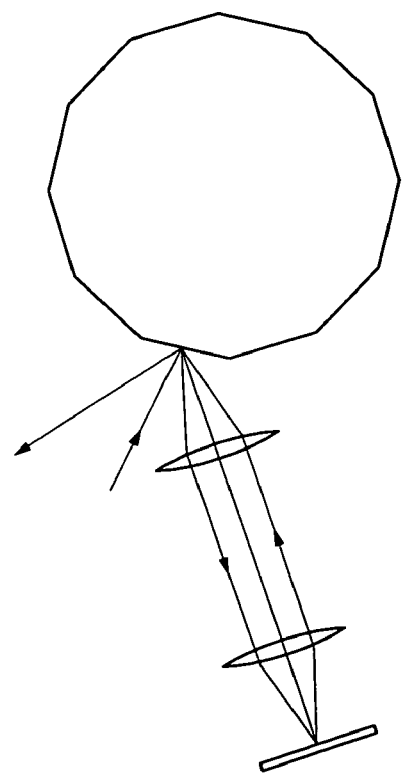
FIG. 2 shows another construction of the conventional deflection angle widening system.
Figure 3:
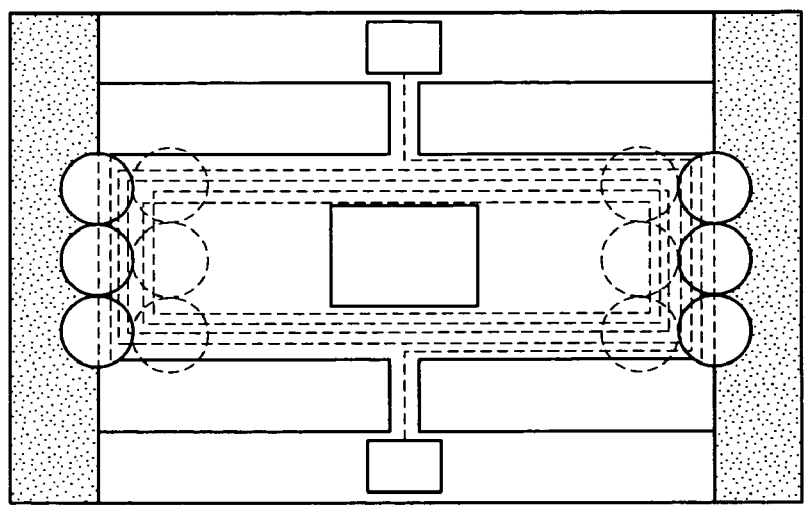
FIG. 3 shows a construction of a conventional MEMS light scanning means.
Figure 4:
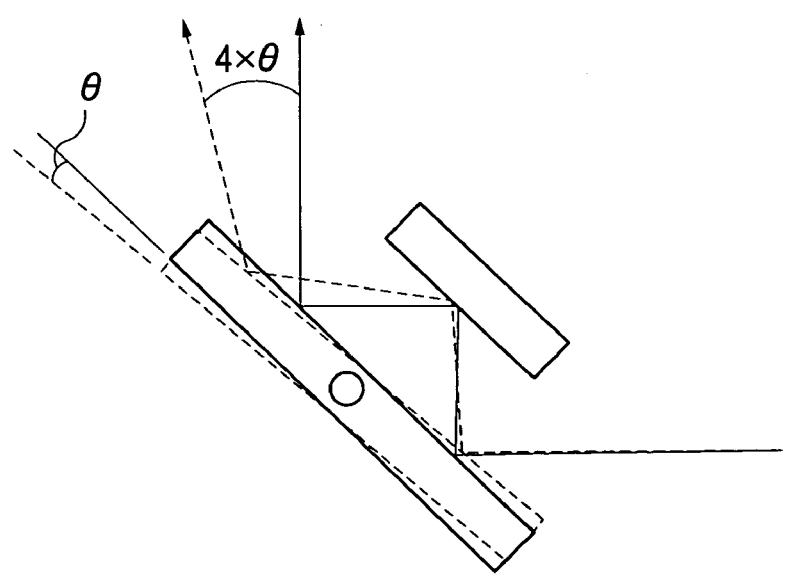
FIG. 4 shows a construction of a conventional deflection angle widening system that uses a galvano-mirror.
Figure 5:
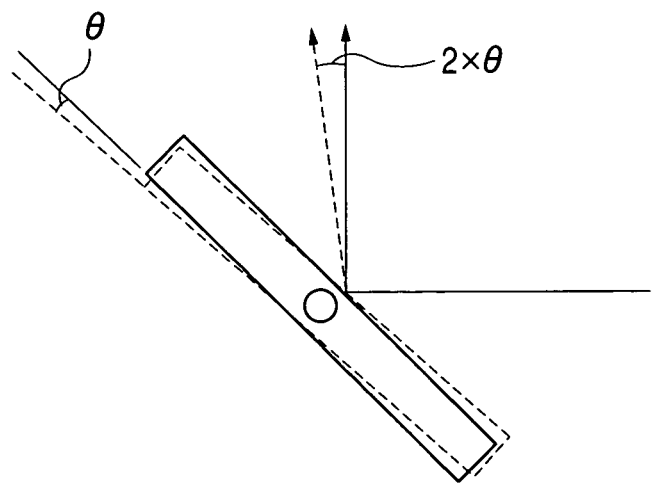
FIG. 5 shows a general relationship between a mechanical deflection angle and a light deflection angle.
Figure 6:
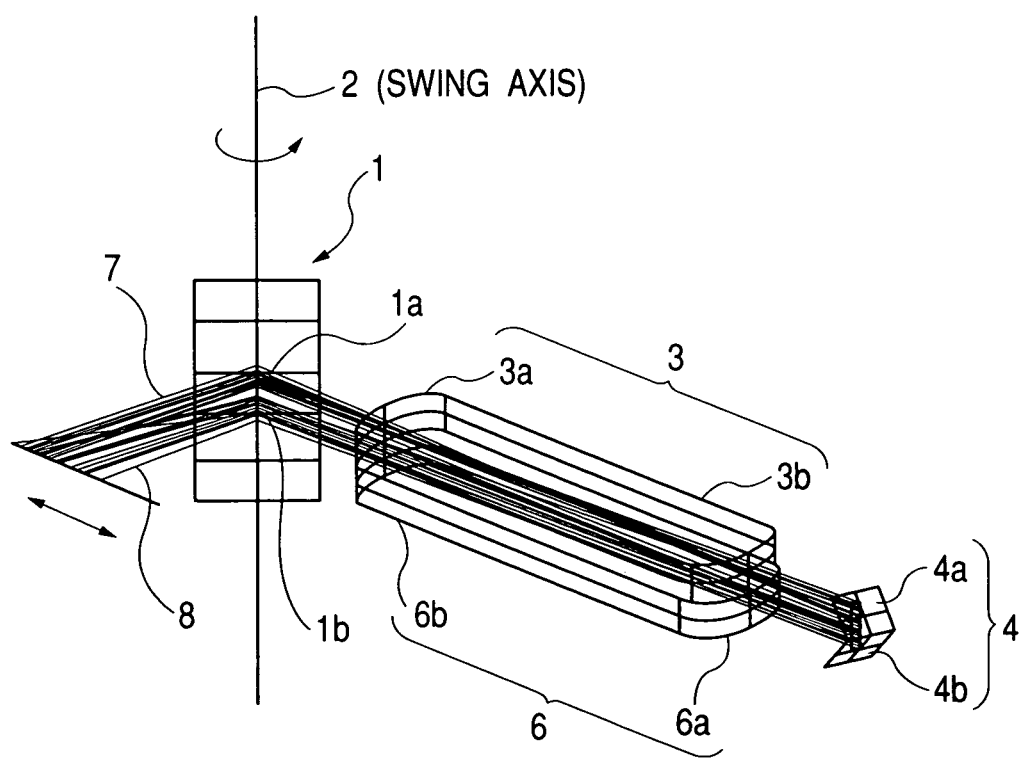
FIG. 6 is a construction diagram according to a first embodiment of the present invention.

FIG. 6 shows an outline of a light scanning optical system according to the first embodiment of the present invention. In this embodiment, incident light 7 is described as collimated light for ease of explanation. Needless to say, however, the incident light 7 may be light other than the collimated light. The incident light 7 enters an MEMS light scanning means (MEMS mirror) 1 and is reflected at a first deflection point 1a. A reflection light beam from the light scanning means 1 enters a first optical system 3, is emitted from the first optical system 3, is reflected by two reflection surfaces 4a and 4b of a reflection means (reflection optical system) 4, and enters a second optical system 6. Then, light emitted from the second optical system 6 enters the light scanning means 1 again at a second deflection point 1b that is different from the first deflection point 1a, and is deflected as emission light 8. In this manner, light is deflected twice by the light scanning means 1, so that it becomes possible to widen a deflection angle. Here, the MEMS light scanning means 1 has a substantially planar reflection surface having no refractive power (at least planar at the deflection points 1a and 1b described above), and the planar reflection surface is oscillated (makes a reciprocating motion) in a rotation direction about a swing (rotation) axis 2 formed integrally with the planar reflection surface (more precisely, about an approximately center line of the swing axis 2). At this time, the swing axis is contained substantially in the reflection surface, and the deflection points 1a and 1b are substantially different points on the swing axis, so that even if the reflection surface is oscillated about the swing axis, the positions of the deflection points 1a and 1b remain substantially constant. That is, the construction is achieved in which the deflection points 1a and 1b are both positioned substantially on the swing axis of the light scanning means but are arranged at mutually different positions in the swing axis direction.

Figure 7A:
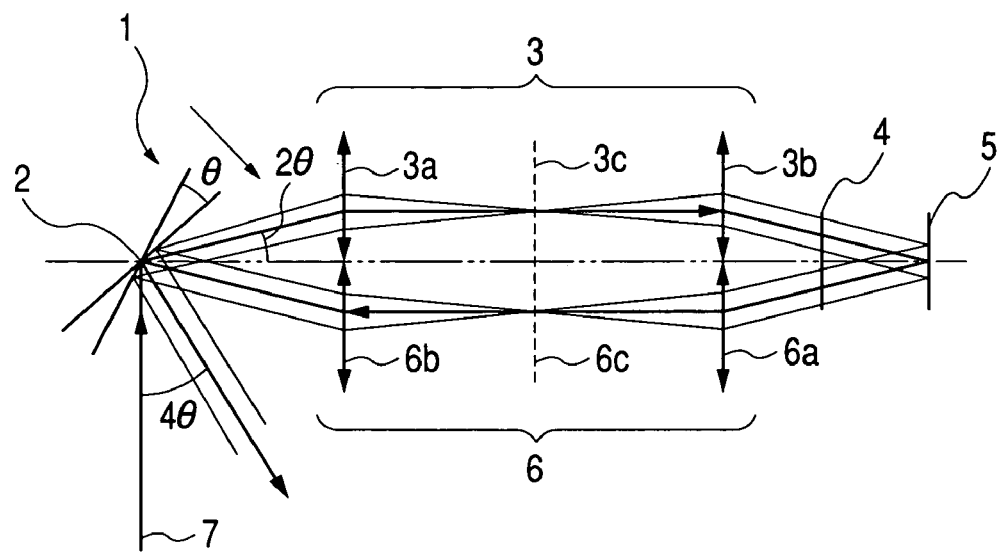
FIGS. 7A and 7B are each an explanatory diagram of the first embodiment of the present invention.

Next, this embodiment will be described in more detail. FIG. 7A shows an optical construction of the light scanning optical system in a plane perpendicular to the swing axis 2 of the light scanning means 1, while FIG. 7B shows an optical construction thereof in a plane orthogonal to the perpendicular plane.

First, the construction of the light scanning optical system in the plane perpendicular to the swing axis 2 will be described with reference to FIG. 7A. In this drawing, optical paths are drawn for ease of explanation. The incident light 7 enters the light scanning means 1 at the deflection point 1a. The first optical system 3 has two optical surfaces 3a and 3b that constitute an afocal system and form a conjugate point 5a that is conjugate with the deflection point 1a at a position 5 that is approximately conjugate with the light deflection means. Like the first optical system, the second optical system 6 also has two optical surfaces 6a and 6b that constitute an afocal optical system and form a point that is conjugate with the point 5a on the light scanning means.

The first optical system and the second optical system each constitute an equal-magnification afocal system. With this construction, when the light scanning means is tilted by θ, the incident light on the first optical system is deflected by 2θ that is twice as large as the tilting angle. Then, the light enters the light scanning means again by passing through the first optical system and the second optical system, so that the deflection angle is doubled and becomes 4θ.

Figure 7B:
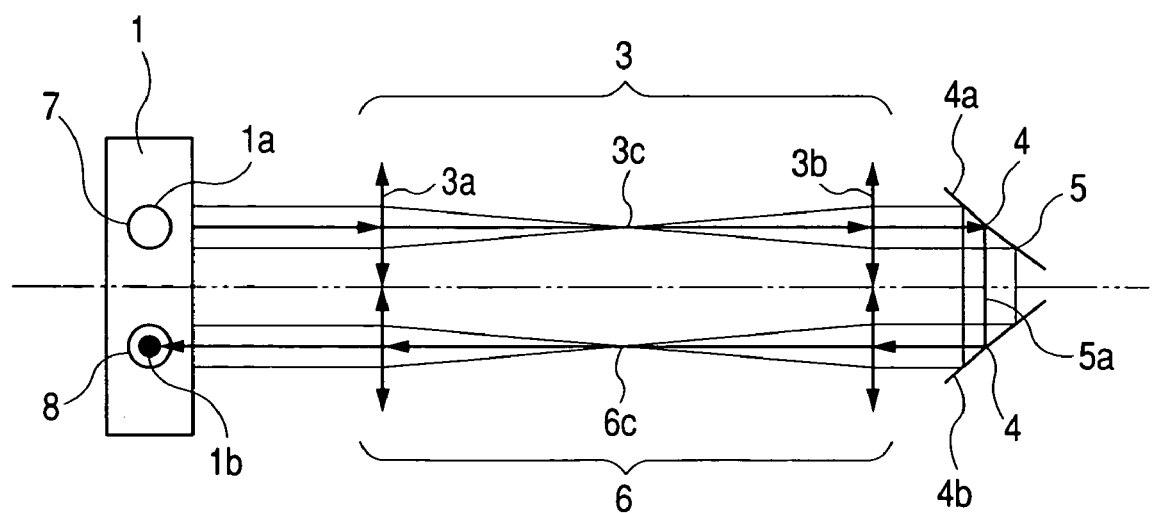

FIG. 7B shows an optical construction of the light scanning optical system in a plane containing the swing angle 2. Also in this plane, the first optical system and the second optical system each have an optical power and constitute an afocal system, as shown in this drawing. Accordingly, two condensing points 3c and 6c are formed in the first optical system and the second optical system, respectively. In FIG. 7A, the conjugate relationship is illustrated in an easy-to-understand manner. As shown in FIG. 7B, the two reflection surfaces 4a and 4b are formed between the first optical system and the second optical system according to the construction of this embodiment. With this construction, the optical path is returned, and the two deflection points on the light scanning means 1 are spaced apart from each other by a limited distance. The conjugate point 5a in FIG. 7A is formed between the reflection surfaces 4a and 4b.

With the construction where the first deflection point and the second deflection point are set in the conjugate relationship on the light scanning means, it becomes possible to reduce regions entered by light at the first deflection point and the second deflection point on the light scanning means. As a result, it becomes possible to keep small the size of the reflection surface of the light scanning means 1 in the plane perpendicular to the swing axis 2 (it becomes possible to reduce a width of the light scanning means 1 in a direction that is perpendicular to the swing axis). Also, the first deflection point and the second deflection point are spaced apart from each other by the limited distance using the reflection means 4, so that it becomes possible to eliminate optical path interference.

In this embodiment, the first optical system and the second optical system are constructed using different optical systems, although the functions of the first and second optical system are the same. However, these optical systems may be constructed using the same optical system. Further, the optical systems may be constructed as a single optical system. Also, in this embodiment, the first optical system and the second optical system are described as refractive surfaces. However, these optical systems may be constructed as reflection surfaces if an optical condition is satisfied. Further, in this embodiment, the reflection means 4 is constructed using the two reflection surfaces 4a and 4b. However, the reflection means 4 may be constructed using a single reflection surface or three or more reflection surfaces. Also, the first optical system and the second optical system are each set as an equal-magnification afocal system. However, the present invention is not specifically limited to this.

With the construction described above, it becomes possible to one-dimensionally deflect light using the light scanning means 1.

Here, in the first embodiment, light is deflected twice by the light scanning means. However, the number of times of deflection by the light scanning means is not limited to two and the deflection may be performed three or more times. In that case, however, it is required to obtain a construction where incident angles of light on the light scanning means become different at each time of deflection. Also, when the deflection is performed three or more times, it is required to additionally provide the construction elements such as the first optical system, the second optical system, and the reflection means.

As described above, the light scanning means is an MEMS scanning means that makes a swinging motion about a certain axis, which is a device that swings about an axis (oscillates in a rotation direction), so that it becomes possible to maintain a favorable optical conjugate relationship between the first deflection point and the second deflection point and to widen an angle of deflection without increasing the size of the light scanning means itself.

Here, the swing axis 2 described above (or the swing center axis of the swing axis 2) is contained substantially in the reflection surface (reflection surface containing the first deflection point and the second deflection point) of the light scanning means. In other words, the swing center axis of the swing axis 2 exists substantially in the reflection surface of the light scanning means. This means that a distance from the swing center axis of the swing axis 2 to the reflection surface of the light scanning means becomes $\frac{1}{10}$ or less, more preferably $\frac{1}{100}$ or less, of the focal distance(s) of the first (refractive) optical system and/or the second (refractive) optical system described above.

Also, each of the first optical system and the second optical system may be a member (cylindrical lens, for instance) having a refractive power with respect to a direction that is perpendicular to the swing axis (direction in which the light come out from the second deflection point is scanned), an ordinary refractive lens that is a lens having refractive powers both in the direction that is perpendicular to the swing axis and in a direction that is parallel to the swing axis, or a toric lens where a refractive power in the direction that is perpendicular to the swing axis is stronger than a refractive power in the direction that is parallel to the swing axis.

<Second Embodiment>

A second embodiment of the present invention will be described with reference to FIGS. 8, 9A, and 9B.

Figure 8:
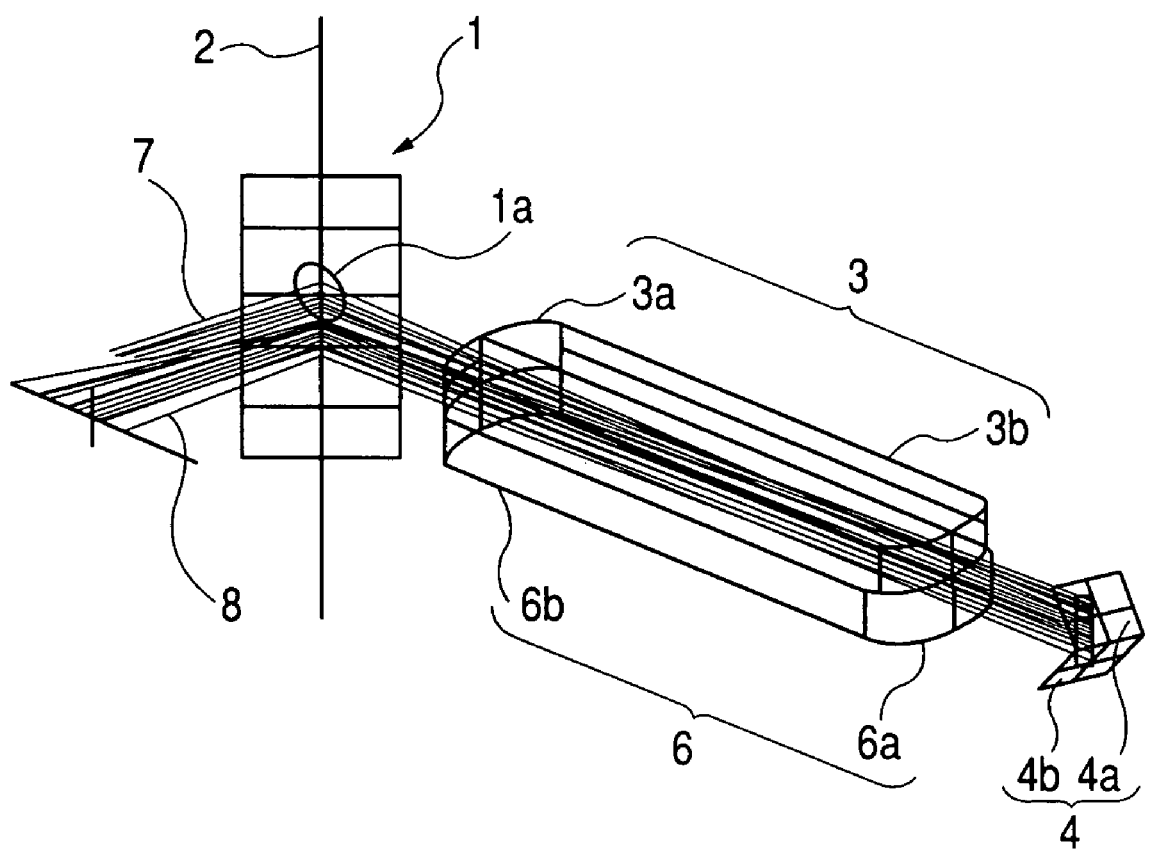
FIG. 8 is a construction diagram according to a second embodiment of the present invention.
Figure 9A:
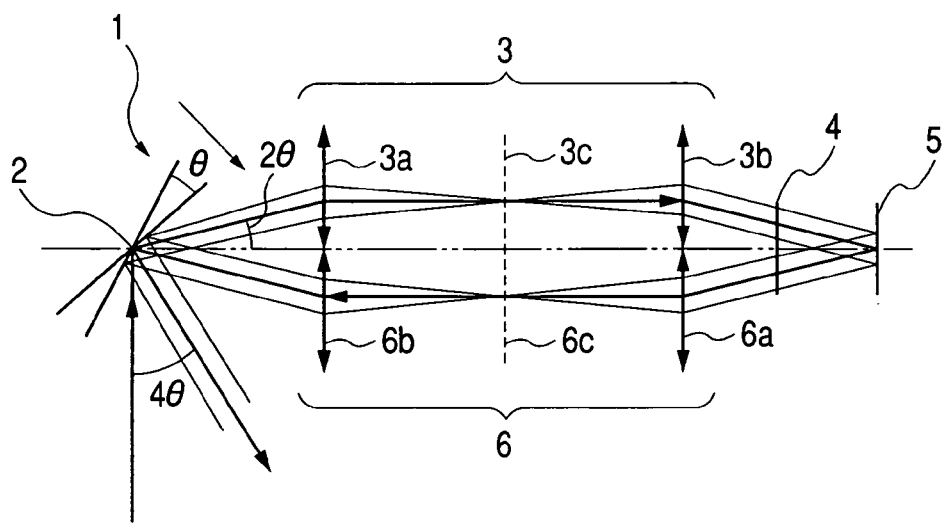
FIGS. 9A and 9B are each an explanatory diagram of the second embodiment of the present invention.
Figure 9B:
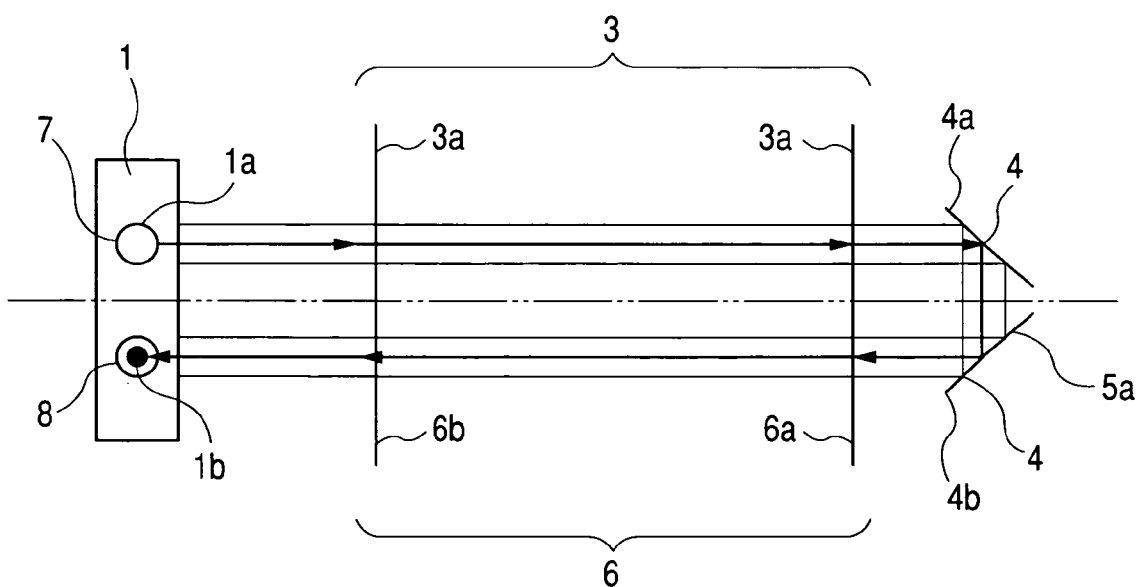

FIGS. 8, 9A, and 9B each show an outline of a light scanning optical system according to the second embodiment of the present invention. Each construction element given the same reference numeral as in FIGS. 6, 7A, and 7B has the same function, and therefore the description thereof is omitted in this embodiment.

The construction according to the second embodiment is almost the same as the construction according to the first embodiment. However, the second embodiment differs from the first embodiment in that the first optical system and the second optical system are each a cylindrical optical system having an optical power only in a plane perpendicular to a swing axis 2.

This embodiment will be described in detail. FIG. 9A shows an optical construction of the light scanning optical system in a plane perpendicular to the swing axis 2 of a light scanning means 1, while FIG. 9B shows an optical construction thereof in a plane orthogonal to the perpendicular plane.

First, the construction of the light scanning optical system in the plane perpendicular to the swing axis 2 of the light scanning means 1 will be described with reference to FIG. 9A. In FIG. 9A, optical paths are drawn for ease of explanation. Incident light 7 enters the light scanning means 1 at a deflection point 1a. The first optical system 3 has two optical surfaces 3a and 3b that constitute an afocal system in the plane perpendicular to the swing axis 2 and form a point 5a that is conjugate with the deflection point 1a. Like the first optical system, a second optical system 6 also has optical surfaces 6a and 6b that constitute an afocal optical system and form a point (deflection point 1b) that is conjugate with the point 5a on the light scanning means.

The first optical system and the second optical system each constitute an equal-magnification afocal system. With this construction, when the light scanning means 1 is tilted by θ, the light come out from the light scanning means 1 and entering the first optical system is deflected by 2θ that is twice as large as the tilting angle. Then, the light enters the light scanning means 1 again by passing through the second optical system, so that the deflection angle becomes 4θ.

FIG. 9B shows an optical construction of the light scanning optical system in a plane containing the swing axis 2 of the light scanning means 1. The second embodiment differs from the first embodiment in that in this cross section, the first optical system and the second optical system have no optical power. Accordingly, in this cross section, a light flux is illustrated as parallel light.

Formed between the first optical system and the second optical system is a reflection means 4 (reflection surfaces 4a and 4b), with which the first deflection point 1a and the second deflection point 1b on the light scanning means 1 are spaced apart from each other by a limited distance in a direction of the swing axis 2 on the light scanning means. As a result, it becomes possible to eliminate optical path interference.

In this embodiment, the first optical system and the second optical system are constructed using different optical systems. However, these optical systems may be constructed using the same optical system. Further, the optical systems may be constructed as a single optical system. In particular, in this embodiment, the first optical system and the second optical system are each constructed using a cylindrical lens, so that it is possible to integrally construct these two optical systems with ease.

Also, in this embodiment, the first optical system and the second optical system have been described as refractive surfaces. However, it is also possible to construct these optical systems as reflection surfaces if an optical condition is satisfied.

Further, the first embodiment relates to a case where each of the first optical system and the second optical system has powers in two cross sections, and the second embodiment relates to a case where each of the optical systems is constructed as a cylindrical lens. However, even if only the first optical system or the second optical system is constructed as a cylindrical lens, the same effect can be achieved.

Also, in the above embodiments, the first optical system and the second optical system are each described as an equal-magnification afocal optical system. However, the present invention is not specifically limited to this.

<Third Embodiment>

A third embodiment of the present invention will be described with reference to FIG. 10.

This embodiment is an example where a light scanning optical system that is capable of two-dimensionally scanning light is constructed using the light scanning optical system described in the first embodiment or the second embodiment as a first light scanning means, and combining the first light scanning means with a scanning surface 9a of a second light scanning means 9 that scans light in a direction that is perpendicular to the scanning direction of the first light scanning means. Each construction element given the same reference numeral as in the first or second embodiment has the same function, and therefore the description thereof is omitted in this embodiment. Incident light 7 on the light scanning means 1 enters the light scanning means again by passing through the first optical system, the reflection means, and the second optical system, and is emitted from the light scanning means 1 as emission light 8. The light scanning means 1 is an optical system having a reflection surface and is capable of deflecting the incident light by 4θ that is four times as large as the mechanical deflection angle θ.

Figure 10:
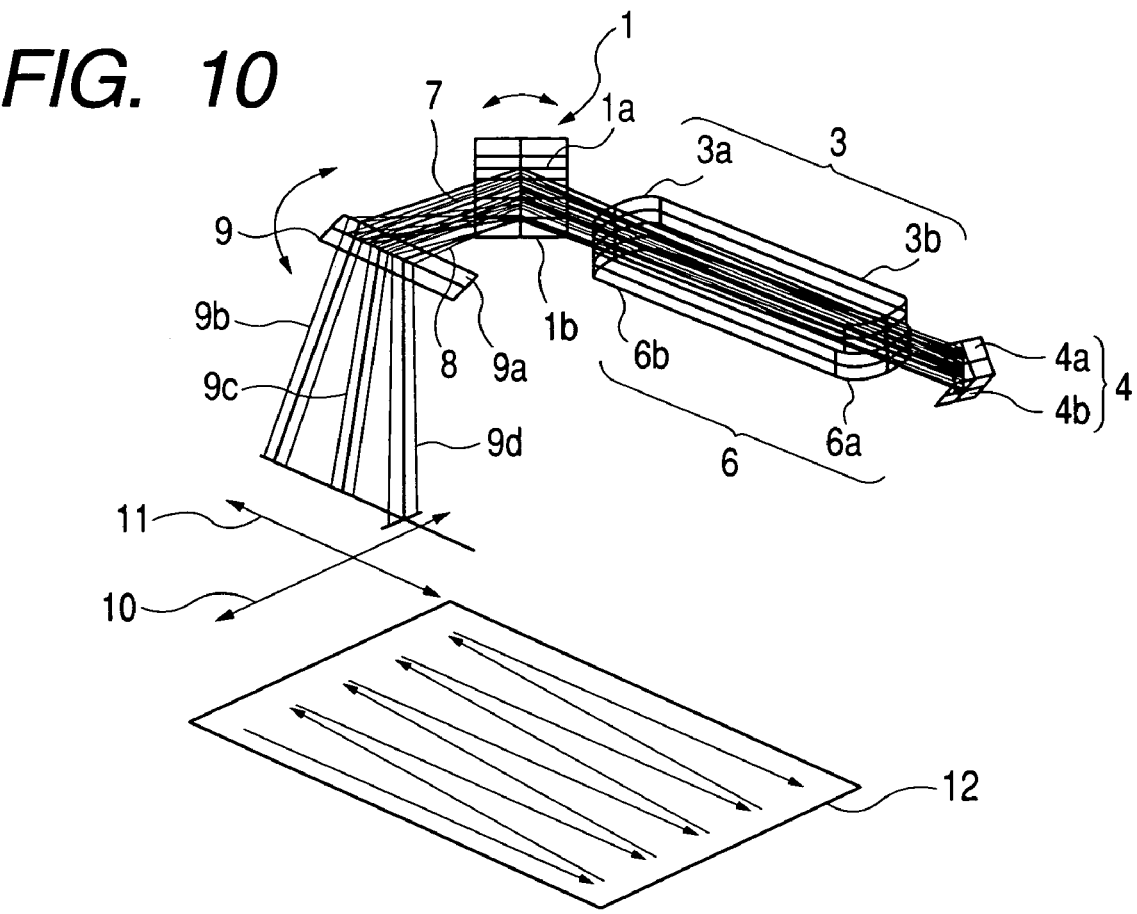
FIG. 10 is a construction diagram according to a third embodiment of the present invention.

Then, the emission light 8 come out from the light scanning means 1 is deflected by the scanning surface 9a of the second light scanning means 9 at different points in accordance with scanning positions by the first light scanning means and is projected onto a screen (projection target surface) 12 as projection light 9b, 9c, and 9d, as shown in FIG. 10. In FIG. 10, the first light scanning means 1 is constructed so as to scan the projection light onto the screen in a scanning direction 11, and the second light scanning means 9 is constructed so as to be capable of scanning the projection light onto the screen in a scanning direction 10.

In this embodiment, the second light scanning means 9 may be an MEMS light scanning means that is similar to the first light scanning means 1. However, the second light scanning means 9 may be constructed so as to adjust the direction of the mirror using an electromagnetic motor or the like. In this case, however, it is preferable that regions of the second light scanning means 9 entered by the light exist substantially on the swing axis of the second light scanning means 9. Accordingly, like in the case of the first light scanning means, it is preferable that deflection points, at which the light enters the second light scanning means, exist substantially on the swing axis of the second light scanning means, and the positions of the deflection points remain substantially constant (do not move) even if the second light scanning means swings about the swing axis.

<Modifications>

Figure 13A:
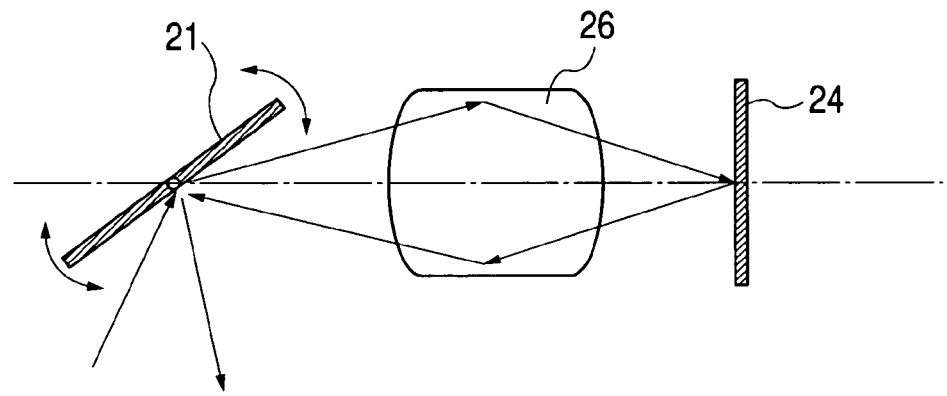
FIGS. 13A and 13B are each an explanatory diagram of a first modification of the present invention.
Figure 13B:
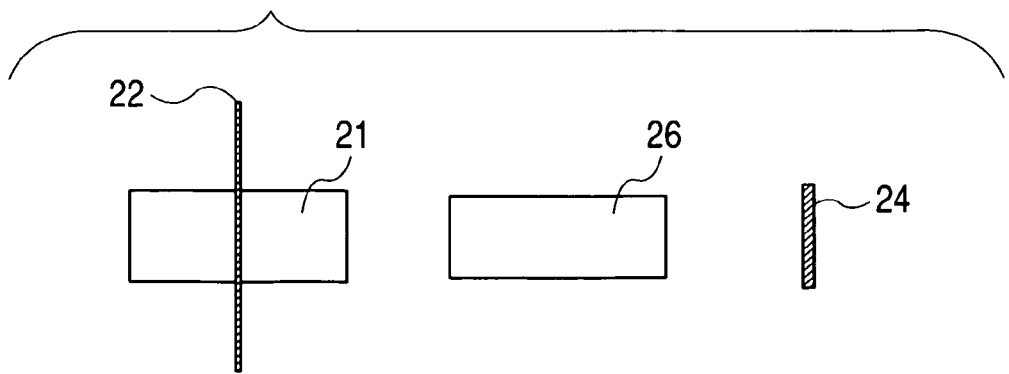

A first modification will be described with reference to FIGS. 13A and 13B. FIG. 13A shows an optical construction in a plane perpendicular to the swing axis of the light scanning means, while FIG. 13B shows an optical construction in a plane orthogonal to the perpendicular plane. In the first to third embodiments, the optical path is bent by the reflection optical system in the direction that is parallel to the swing axis, so that the first deflection point and the second deflection point are displaced in the direction that is parallel to the swing axis 22 (that is, the first deflection point and the second deflection point existing at different positions are set at substantially the same position with respect to the direction that is perpendicular to the swing axis). In FIGS. 13A and 13B, however, a reflection optical system 24 is constructed using a planar mirror, and a point in proximity to the planar mirror is set approximately conjugate with the first deflection point and the second deflection point. If this construction makes it difficult to separate the optical path of incident light on a deflection mirror 21 (reflection surface of the light scanning means) and the optical path of emission light from the deflection mirror 21 from each other, the light may be caused to enter the deflection mirror 21 while being tilted with respect to the swing axis 22. With this construction, the optical paths can be separated from each other easily. In this case, it is preferable that the angle, by which the incident light is tilted with respect to the swing axis, is set at 10° or less, more preferably at 5° or less.

Figure 14A:
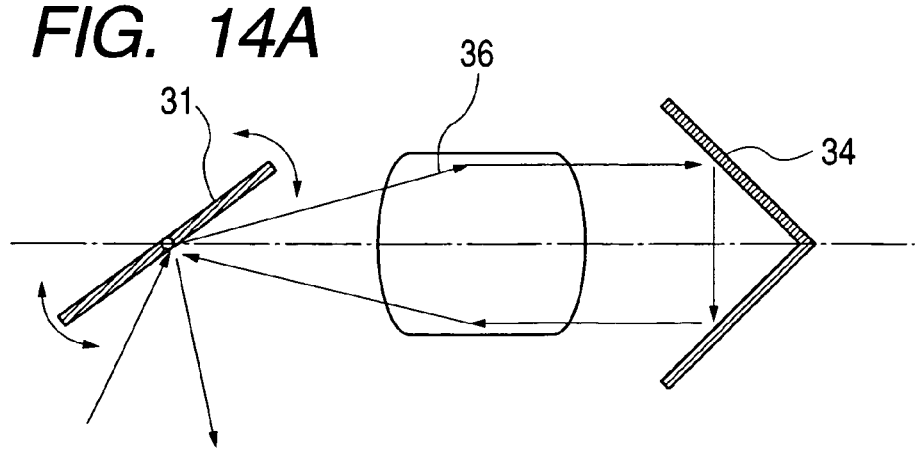
FIGS. 14A and 14B are each an explanatory diagram of a second modification of the present invention.
Figure 14B:
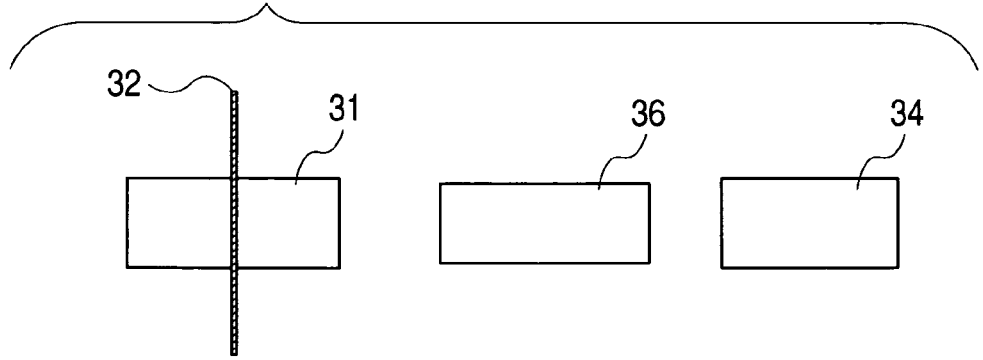

Next, a second modification will be described with reference to FIGS. 14A and 14B. In the first to third embodiments, a point that is substantially conjugate with the first deflection point and the second deflection point is formed at a predetermined position on the optical path between the first deflection point and the second deflection point, that is, at a position in proximity to the reflection optical system (reflection means) 34. However, the present invention is not limited to this, and this construction may be changed so that the light scanning optical system of the embodiments does not has the point that is conjugate with the first deflection point and the second deflection point on the optical path between the first deflection point and the second deflection point. For instance, a construction shown in FIGS. 14A and 14B is conceivable. In these drawings, light come out from a deflection mirror 31 (reflection surface of the light scanning means) enters a refractive optical system 36. Then, the light emitted from the refractive optical system 36 is reflected by a reflection optical system 34, enters the refractive optical system 36 again, and enters the deflection mirror 31 again. In the case of the construction shown in FIGS. 14A and 14B, however, it becomes difficult to separate the optical path of the incident light on the deflection mirror 31 and the optical path of the emission light from the deflection mirror 31 from each other. In view of this problem, the incident light may be caused to enter the deflection mirror 31 while being tilted with respect to a swing axis 32. In that case, it is preferable that the tilting angle is set at 10° or less, more preferably 5° or less.

Figure 15A:
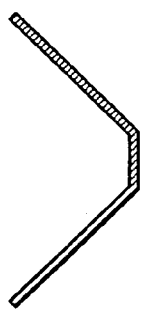
FIGS. 15A, 15B, and 15C are each an explanatory diagram of a modification of a reflection optical system according to the present invention.
Figure 15B:
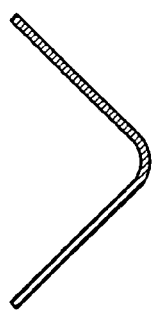
Figure 15C:
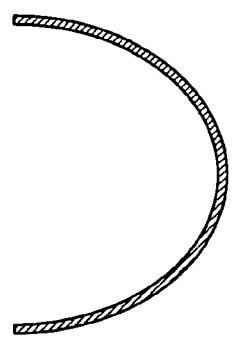

Also, as a modification of the construction of the reflection optical system, constructions shown in FIGS. 15A to 15C are conceivable. The integrally constructed two reflection surfaces shown in FIGS. 6 and 8 and other drawings may be changed so as to have a shape shown in FIG. 15A where a connection portion between the reflection surfaces is chamfered (this construction may be regarded as three reflection surfaces) or a shape shown in FIG. 15B where the connection portion is given a curvature (R). Alternatively, the two reflection surfaces may be replaced with a reflection surface having a curvature, such as a parabolic mirror or an elliptic mirror.

<Fourth Embodiment>

Figure 11:
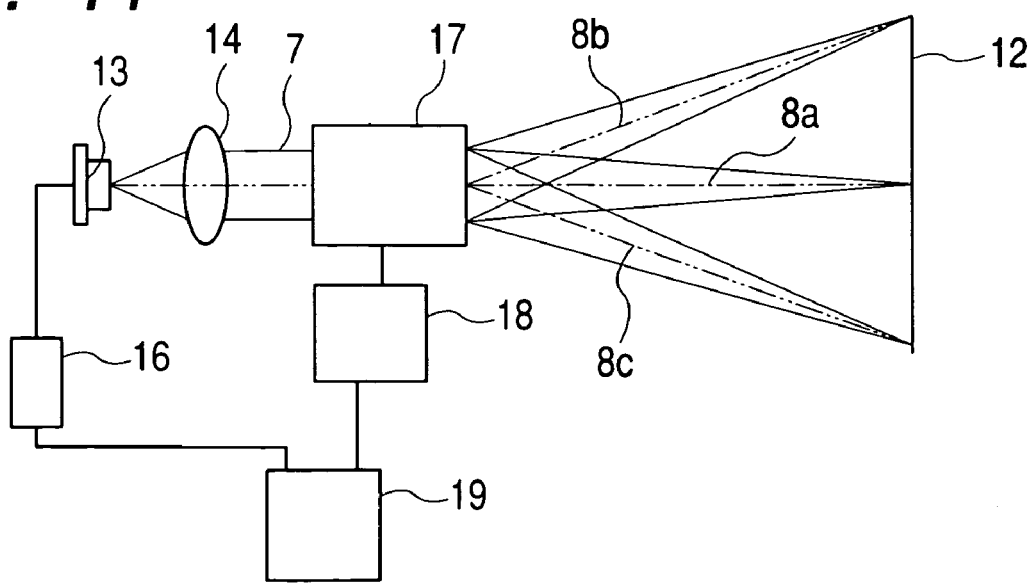
FIG. 11 is a system outline diagram according to a fourth embodiment of the present invention.

Next, a fourth embodiment will be described with reference to FIG. 11 showing an outline of the fourth embodiment. The fourth embodiment is an example of an image projection apparatus that uses the light scanning optical system according to the first embodiment or the second embodiment. In FIG. 11, reference numeral 17 denotes the light scanning optical system according to the first embodiment or the second embodiment. A light beam radiated from a light source 13 passes through an optical system 14 and becomes incident light 7. The incident light 7 is scanned by the light scanning optical system 17 as emission light 8 (8a, 8b, and 8c) and is condensed on a scan target surface 12 as converged light. Here, the scanning optical system 17 constitutes a so-called post-objective type scanning system. However, the present invention is not limited to this. A drive circuit 18 is electrically connected to a light scanning means in the scanning optical system 17, and a drive circuit 16 that is capable of modulating the light source 13 is connected to the light source 13, with these drive circuits being connected to a device drive circuit 19. With this construction, it becomes possible to form a desired image on the scan target surface 12 through synchronous control of the light source and the light scanning means.

<Fifth Embodiment>

Next, a fifth embodiment will be described with reference to FIG. 12. This drawing shows an outline of the fifth embodiment. The fifth embodiment is an example of an image projection apparatus that uses the light scanning optical system according to the third embodiment.

Figure 12:
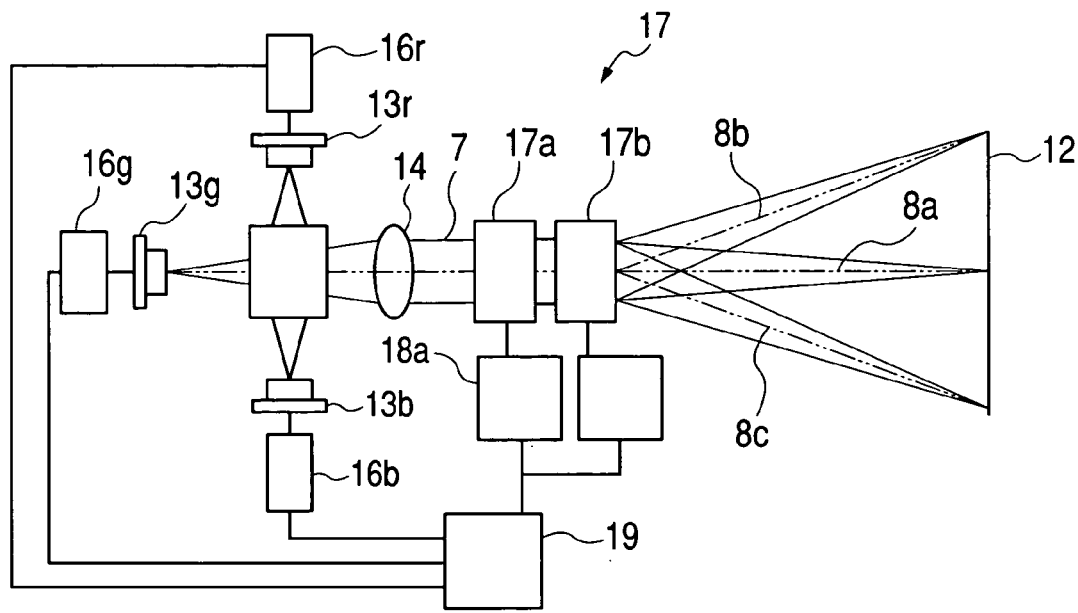
FIG. 12 is a system outline diagram according to a fifth embodiment of the present invention.

As shown in FIG. 12, the image projection apparatus according to this embodiment includes a color synthesis system 20 for color-synthesizing light from light sources that radiate light having three mutually different wavelengths. Also, a light scanning optical system 17 is the light scanning optical system according to the third embodiment and includes a first light scanning means 17a and a second light scanning means 17b. With this construction, scanning in two directions orthogonal to each other is performed. The first light scanning means 17a is the light scanning means described in the first embodiment or the second embodiment. In FIG. 12, a scan target surface (projection target surface) 12 is a two-dimensional area such as a screen. Light sources 13r, 13g, and 13b are respectively connected to drive circuits 16r, 16g, and 16b, and are modulated and controlled by the drive circuits in synchronization with operations of the light scanning means 17a and 17b in the light scanning optical system 17. With this construction, it becomes possible to form an image on the scan target surface 12 (screen) based on a not-shown desired video signal.

When red, green, and blue light sources are used as the light sources 13r, 13g, and 13b, it is possible to display a color image. As the light sources, it is possible to use LEDs, semiconductor lasers, light sources having wavelength conversion elements, or the like. In this embodiment, a case where the light sources are directly modulated has been described. However, the present invention is not limited to this.

In each of the first, second, and third embodiments, the light scanning optical system is provided with the first optical system forming the conjugate point 5a that is conjugate with the first deflection point and the second optical system forming the second deflection point that is conjugate with the conjugate point 5a. However, the present invention is not limited to this, and a construction without the conjugate point 5a is also possible. For instance, in FIG. 6 relating to the first embodiment, a conical reflection surface (whose inner surface is a reflection surface) having a vertex directed toward points 3b and 6a may be provided between points 3a and 3b of the first optical system and between points 6a and 6b of the second optical system. Even in this case, it is possible to provide the same effect of the present invention. Note that this conical reflection surface may be constructed using a mirror or a prism that reflects light with a conical inner surface.

Also, it is preferable that the reflection means 4 has two or more reflection surfaces. However, the reflection means 4 may have a single reflection surface. In this case, however, it is preferable that the incident light 7 on the light scanning means 1 is not perpendicular to the swing axis 2 but is tilted with respect to the swing axis 2. In addition, it is preferable that the optical axis of the first optical system and the optical axis of the second optical system are also tilted with respect to the swing axis 2.

Further, it is possible to construct an image display system in which an image information supply means, such as a video, a camera, a personal computer, or a tuner, for supplying image information is connected to the image projection apparatus described in the fourth or fifth embodiment, and the image projection apparatus projects an image in accordance with the image information from the image information supply means.

With the present invention, it becomes possible to provide a light scanning optical system which has a simple construction, realizes a large deflection angle, and does not suffer from optical path interference, and to provide an image projection apparatus that uses the light scanning optical system. The present invention is particularly effective for a light scanning optical system that uses the MEMS technique.

What is claimed is:

1. A light scanning optical system comprising:
    a reflection surface that reflects incident light;
    a device for swinging or moving the reflection surface about a swing axis that exists in substantially the same plane as the reflection surface; and
    an optical system that has a positive optical power and guides light deflected at a first deflection area on the reflection surface to a second deflection area on the reflection surface,
    wherein the optical system is constructed such that the first deflection area and the second deflection area are in an approximately conjugate relationship, by acting the positive optical power, and
    wherein a first point in the first deflection area and a second point in the second deflection area are points that are approximately conjugate and are shifted in a direction substantially parallel to the swing axis.

2. A light scanning optical system according to claim 1, wherein the first deflection area exists at a position substantially displaced from the second deflection area in a direction of the swing axis.

3. A light scanning optical system according to claim 1, wherein both of the first deflection area and the second deflection area exist substantially on the swing axis.

4. A light scanning optical system according to claim 1, wherein the first deflection area and the second deflection area exist at substantially the same position with respect to a direction that is perpendicular to the swing axis.

5. A light scanning optical system according to claim 1, wherein an area that is substantially conjugate with both of the first deflection area and the second deflection area exists on an optical path of light emitted from the first deflection area to enter the second deflection area.

6. A light scanning optical system according to claim 1, wherein the optical system comprises:
a first optical system that forms a conjugate point that is substantially conjugate with the first deflection area; and
a second optical system that sets the conjugate point and the second deflection area in a substantially conjugate relationship.

7. A light scanning optical system according to claim 6, further comprising:
a reflection optical system that guides light that comes out from the first optical system to the second optical system.

8. A light scanning optical system according to claim 7, wherein the reflection optical system includes at least one reflection surface.

9. A light scanning optical system according to claim 8, wherein the at least one reflection surface is substantially perpendicular to at least one of an optical axis of the first optical system and an optical axis of the second optical system.

10. A light scanning optical system according to claim 8, wherein the at least one reflection surface is substantially parallel to the swing axis.

11. A light scanning optical system according to claim 7, wherein the reflection optical system includes at least two or more reflection surfaces.

12. A light scanning optical system according to claim 5, wherein at least one of the first optical system and the second optical system has a refractive power only in a direction that is perpendicular to the swing axis.

13. A light scanning optical system according to claim 1, wherein the reflection surface makes a rotationally reciprocating motion about the swing axis in a rotation direction.

14. A light scanning optical system according to claim 1, wherein a center point of a light flux at the first deflection area and a center point of a light flux at the second deflection area are spaced apart from each other on the reflection surface by a limited distance.

15. A light scanning optical system according to claim 1, wherein the reflection surface and the swing axis are formed integrally with each other.

16. A light scanning optical system according to claim 7, wherein the reflection optical system comprises:
a first planar reflection surface that reflects light emitted from the first optical system in a direction that is substantially parallel to the swing axis; and
a second planar reflection surface that causes emission light from the first reflection surface to enter the second optical system,
wherein the first deflection area and the second deflection area are displaced in the direction that is substantially parallel to the swing axis.

17. An image projection apparatus comprising: the light scanning optical system according to claim 1;
a light guiding optical system that guides light from a light source to the light scanning optical system; and
a projection optical system that projects light from the light scanning optical system onto a projection target surface.

18. An image projection apparatus according to claim 17, further comprising:
a deflection mirror that deflects light projected from the light scanning optical system by reflection, and guides the deflected light to the projection optical system,
the deflection mirror swinging with respect to further swing axis substantially perpendicular to the swing axis.

19. An image projection apparatus according to claim 17, further comprising:
a deflection mirror that deflects light projected from the light scanning optical system by reflection, and guides the deflected light to the projection optical system,
the deflection mirror swinging to deflect light with respect to a direction substantially perpendicular to the direction along which the scanning optical system scans the light.

20. An image projection apparatus according to claim 17, wherein light from the light source is scanned two-dimensionally by swinging both the light scanning optical system and the further deflection mirror.

21. An image projection apparatus according to claim 17, further comprising:
a color synthesis optical system that synthesizes light in a plurality of colors emitted from a light source.

22. An image projection apparatus according to claim 17, wherein the light in the plurality of colors is light in three colors, red, green, and blue.

23. An image projection apparatus according to claim 17, wherein the color synthesis optical system includes one of a cross dichroic prism and a color synthesis prism whose color synthesis surfaces do not intersect each other.

24. An image projection apparatus according to claim 23, wherein the color synthesis prism includes a plurality of prisms whose number is one of three and four.

25. An image display system comprising:
the image projection apparatus according to claim 17; and
image supply means for supplying image information to the image projection apparatus.

26. A light scanning optical system comprising:
a reflection surface that reflects incident light;
a device for swinging the reflection surface about a swing axis that exists in substantially the same plane as the reflection surface; and
an optical system that has a positive optical power and guides light deflected at a first deflection area on the reflection surface to a second deflection area that is different from the first deflection area on the reflection surface, the first deflection area and the second deflection area being shifted in a direction of the swing axis.

27. An image projection apparatus comprising: the light scanning optical system according to claim 26;
a light guiding optical system that guides light from a light source to the light scanning optical system; and
a projection optical system that projects light from the light scanning optical system onto a projection target surface.

28. An image projection apparatus according to claim 27, further comprising:
a deflection mirror that deflects light projected from the light scanning optical system by reflection, and guides the deflected light to the projection optical system,
the deflection mirror swinging with respect to further swing axis substantially perpendicular to the swing axis.

29. An image projection apparatus according to claim 27, further comprising:

a deflection mirror that deflects light projected from the light scanning optical system by reflection, and guides the deflected light to the projection optical system, the deflection mirror swinging to deflect light with respect to a direction substantially perpendicular to the direction along which the scanning optical system scans the light.

30. An image projection apparatus according to claim 27, wherein light from the light source is scanned two-dimensionally by swinging both the light scanning optical system and the further deflection mirror.

31. An image display system comprising:
the image projection apparatus according to claim 27; and
image supply means for supplying image information to the image projection apparatus.

32. A light scanning optical system comprising:
a reflection surface that reflects incident light;
a device for swinging the reflection surface about a swing axis that exists in substantially the same plane as the reflection surface; and
an optical system that has a positive optical power and guides light deflected at a first deflection point on the reflection surface to a second deflection point that is different from the first deflection point on the reflection surface, the first deflection point and the second deflection point existing substantially on the swing axis.

33. An image projection apparatus comprising:
the light scanning optical system according to claim 32;
a light guiding optical system that guides light from a light source to the light scanning optical system; and
a projection optical system that projects light from the light scanning optical system onto a projection target surface.

34. An image projection apparatus according to claim 33, further comprising:
a deflection mirror that deflects light projected from the light scanning optical system by reflection, and guides the deflected light to the projection optical system,
the deflection mirror swinging with respect to further swing axis substantially perpendicular to the swing axis.

35. An image projection apparatus according to claim 33, further comprising:

a deflection mirror that deflects light projected from the light scanning optical system by reflection, and guides the deflected light to the projection optical system, the deflection mirror swinging to deflect light with respect to a direction substantially perpendicular to the direction along which the scanning optical system scans the light.

36. An image projection apparatus according to claim 33, wherein light from the light source is scanned two-dimensionally by swinging both the light scanning optical system and the deflection mirror.

37. An image display system comprising:
the image projection apparatus according to claim 33; and
image supply means for supplying image information to the image projection apparatus.

38. A light scanning optical system comprising:
a reflection surface that reflects incident light;
a device for swinging or moving the reflection surface about a swing axis that exists in substantially the same plane as the reflection surface; and
an optical system that has a positive optical power and guides light deflected at a first deflection area on the reflection surface to a second deflection area on the reflection surface
wherein the optical system is constructed such that the first deflection area and the second deflection area are in an approximately conjugate relationship,
the optical system forms a conjugate area on an optical path between the first deflection area and the second deflection area, which is conjugate with both the first deflection area and the second deflection area, and
the first deflection area and the second deflection area are not overlapped with each other in the swing axis.

39. An image projection apparatus comprising:
the light scanning optical system according to claim 38;
a light guiding optical system that guides light from a light source to the light scanning optical system; and
a projection optical system that projects light from the light scanning optical system onto a projection target surface.

* * * * *